Sept. 21, 1965  E. J. DE RIDDER ETAL  3,206,895
HYPERBOLIC PARABOLOIDAL ROOF AND METHOD OF MAKING THE SAME
Filed March 27, 1961  6 Sheets-Sheet 1
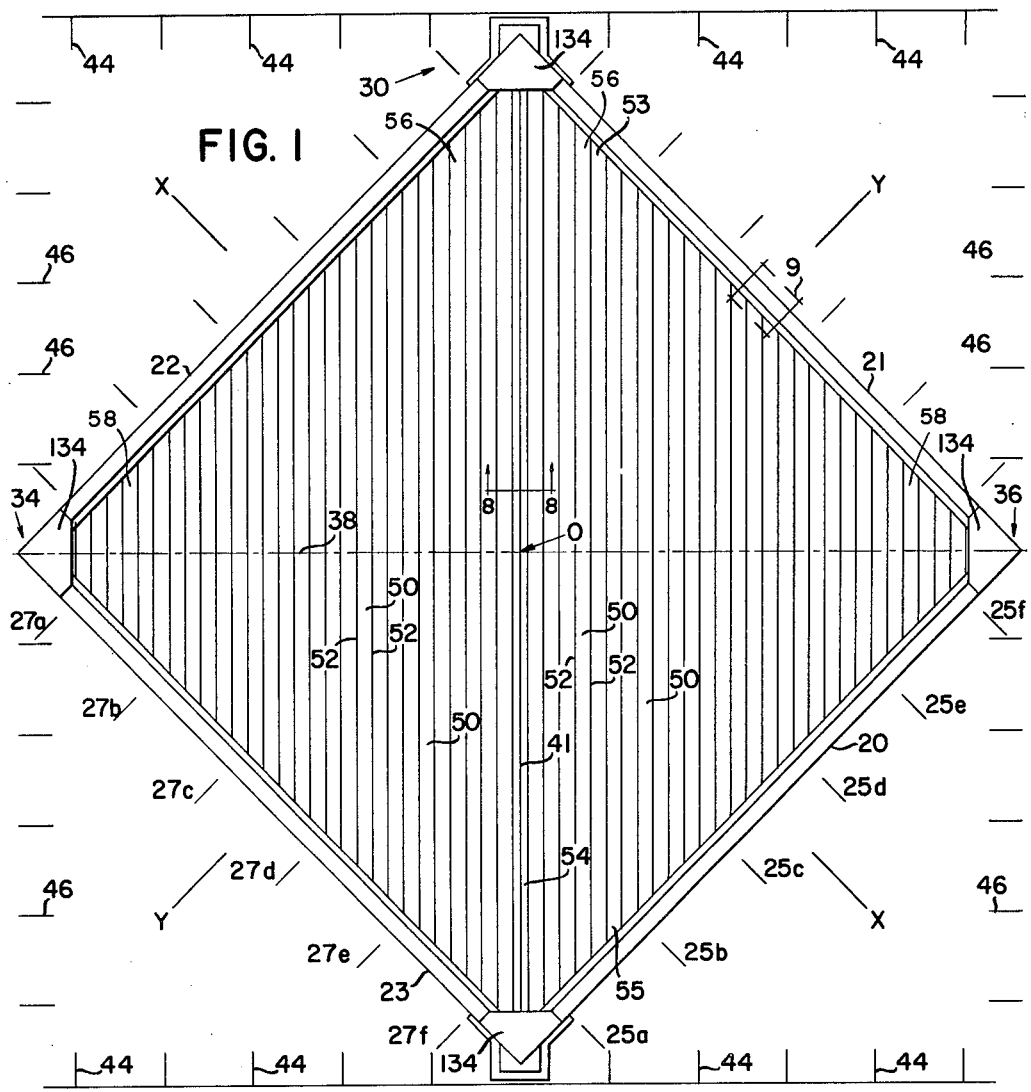
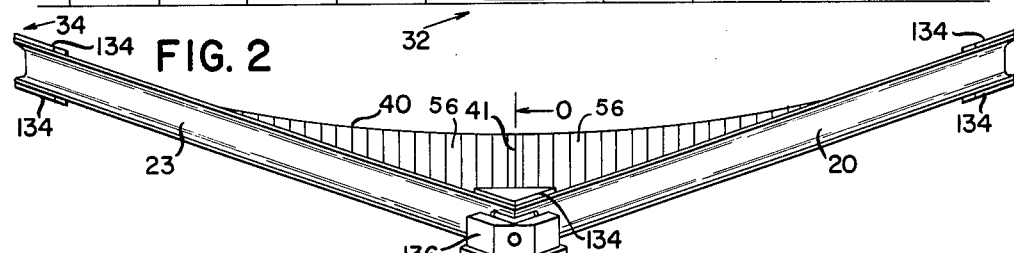
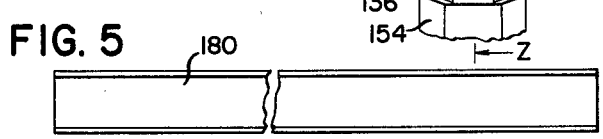
INVENTORS
ERNST J. DeRIDDER
KURT F. GLASER
BY *Glenn, Jackson,*
*Palmer & Matthews*
THEIR ATTORNEYS Sept. 21, 1965     E. J. DE RIDDER ETAL     3,206,895
HYPERBOLIC PARABOLOIDAL ROOF AND METHOD OF MAKING THE SAME
Filed March 27, 1961                         6 Sheets-Sheet 2
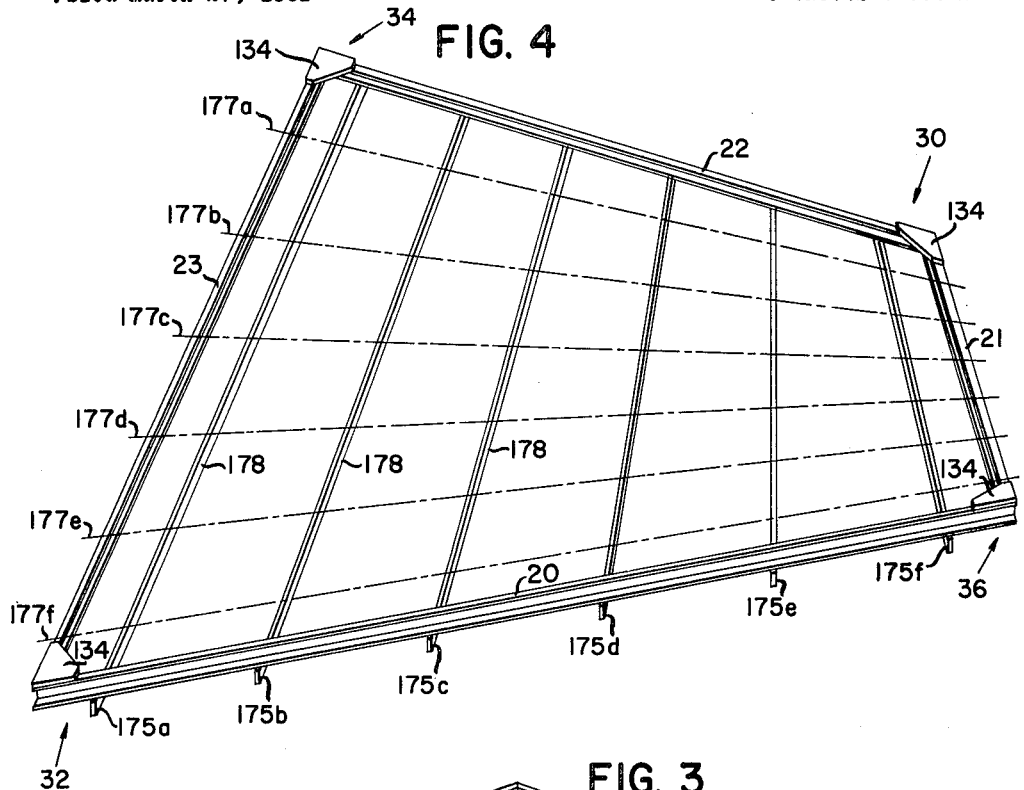
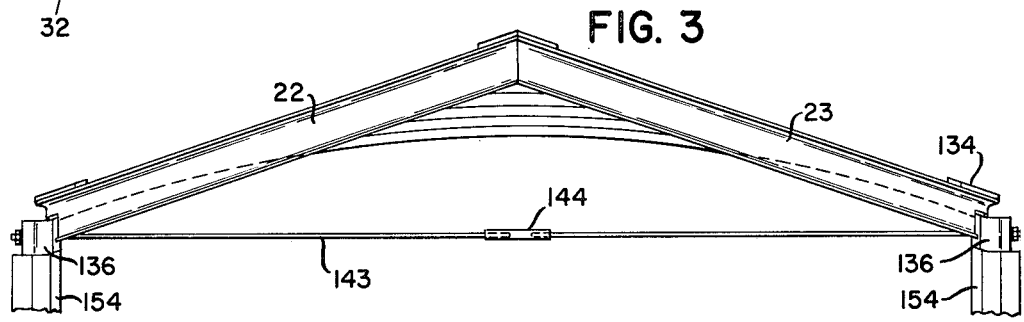
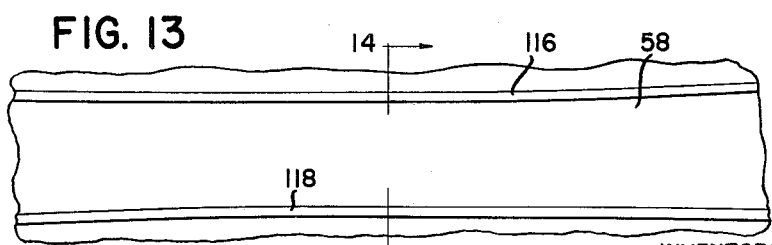
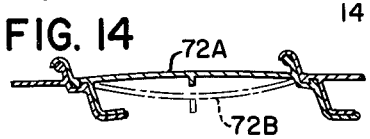
INVENTORS
ERNST J. DeRIDDER
KURT F. GLASER
BY *Glenn, Jackson,*
*Palmer, Matthews*
THEIR ATTORNEYS Sept. 21, 1965  E. J. DE RIDDER ETAL  3,206,895
HYPERBOLIC PARABOLOIDAL ROOF AND METHOD OF MAKING THE SAME
Filed March 27, 1961  6 Sheets-Sheet 3
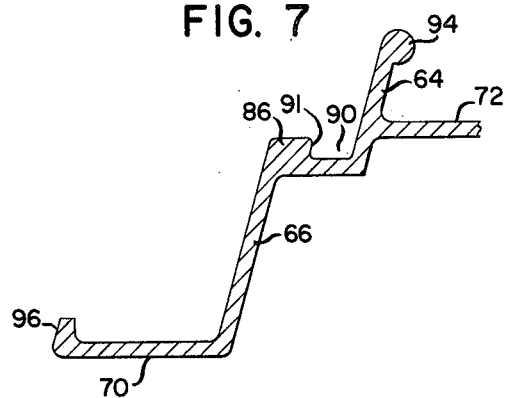
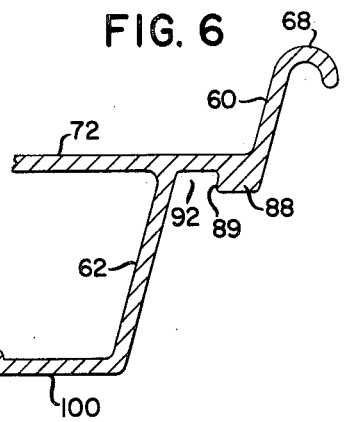
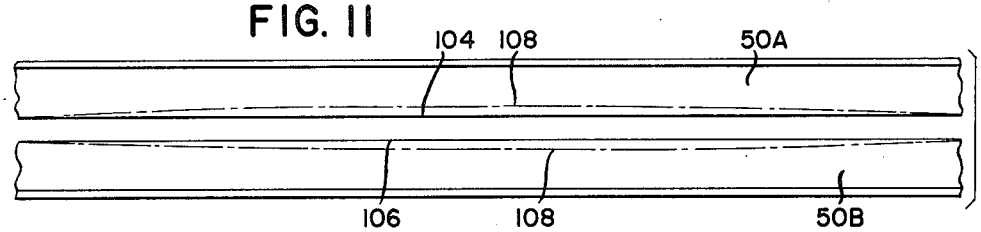
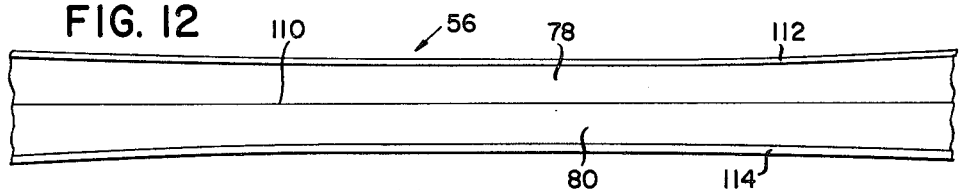
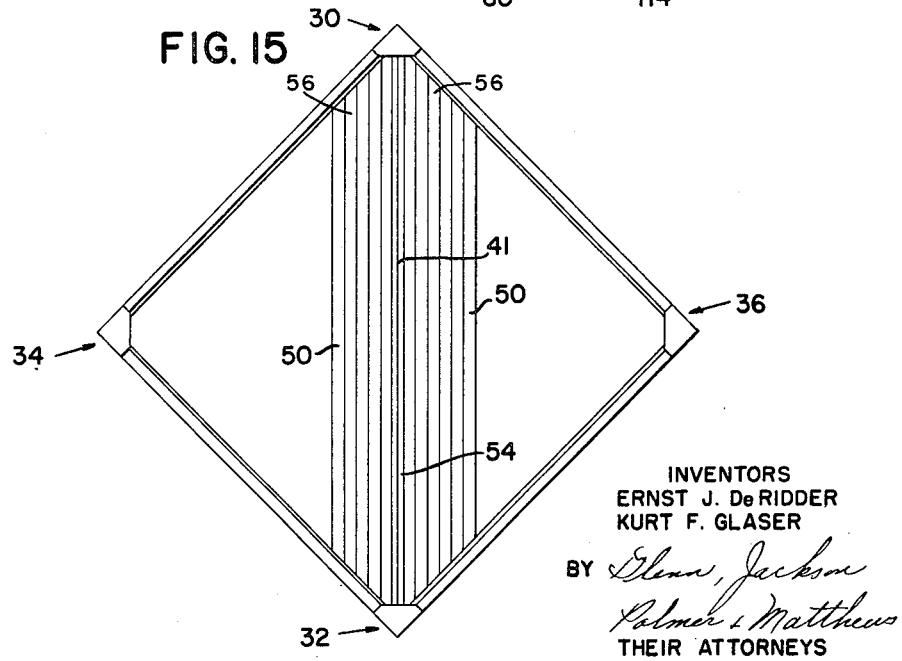
INVENTORS
ERNST J. De RIDDER
KURT F. GLASER
BY *Glenn, Jackson*
*Palmer & Matthews*
THEIR ATTORNEYS Sept. 21, 1965    E. J. DE RIDDER ETAL    3,206,895
HYPERBOLIC PARABOLOIDAL ROOF AND METHOD OF MAKING THE SAME
Filed March 27, 1961    6 Sheets-Sheet 4
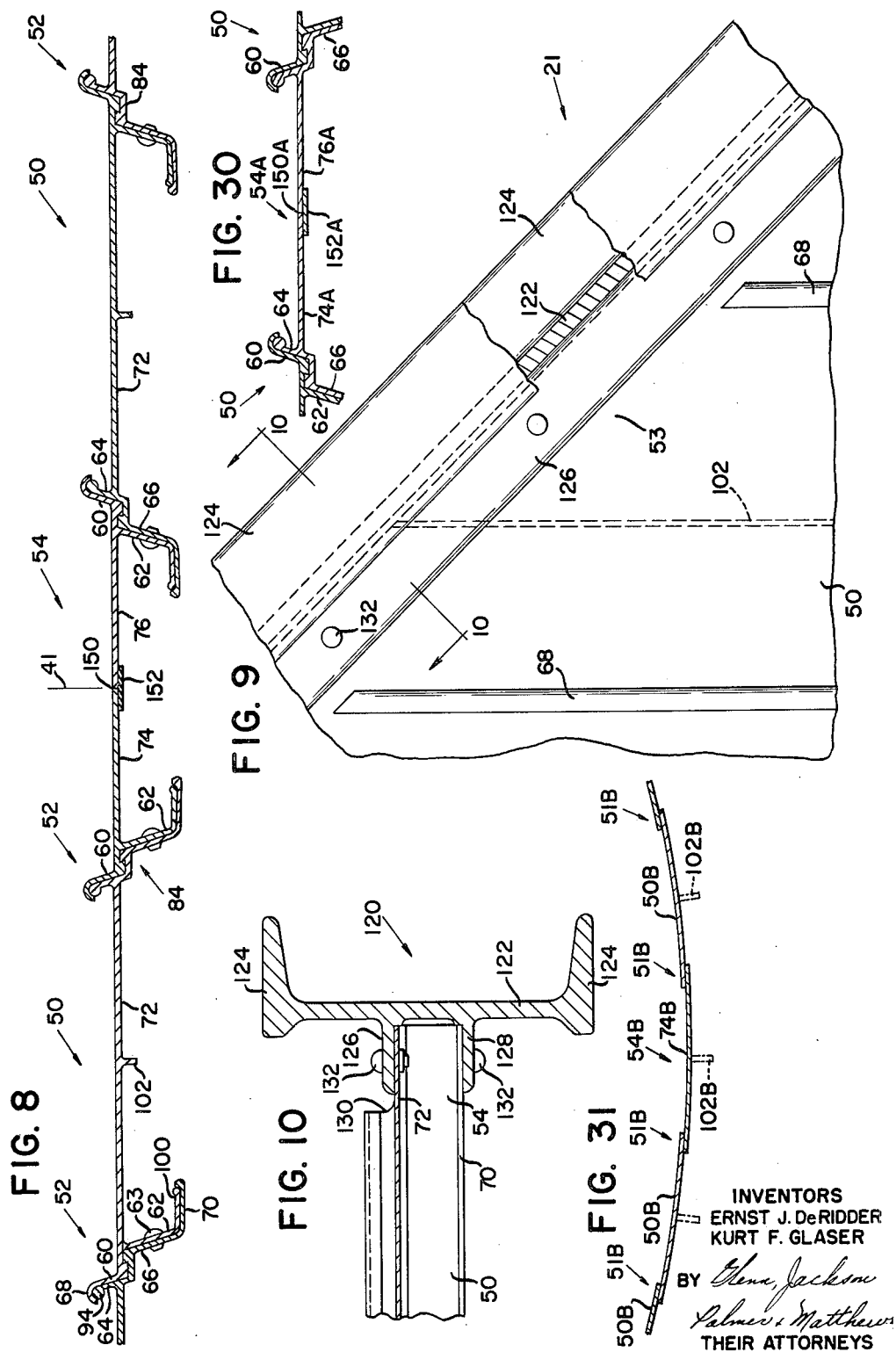
INVENTORS
ERNST J. DeRIDDER
KURT F. GLASER
BY Gene Jackson
Palmer & Matthews
THEIR ATTORNEYS Sept. 21, 1965  E. J. DE RIDDER ETAL  3,206,895
HYPERBOLIC PARABOLOIDAL ROOF AND METHOD OF MAKING THE SAME
Filed March 27, 1961  6 Sheets-Sheet 5
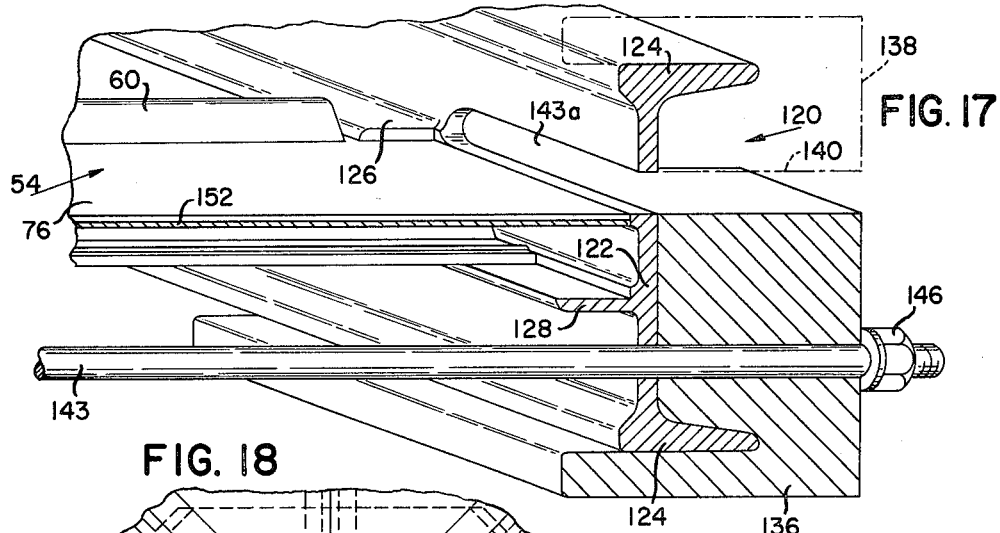
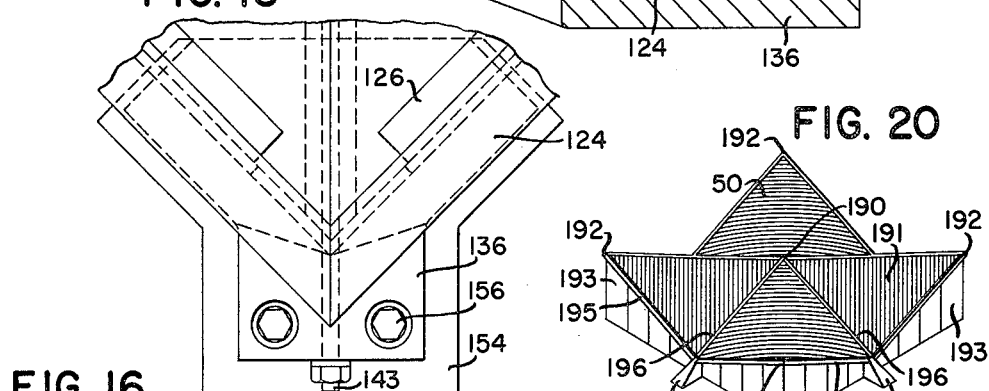
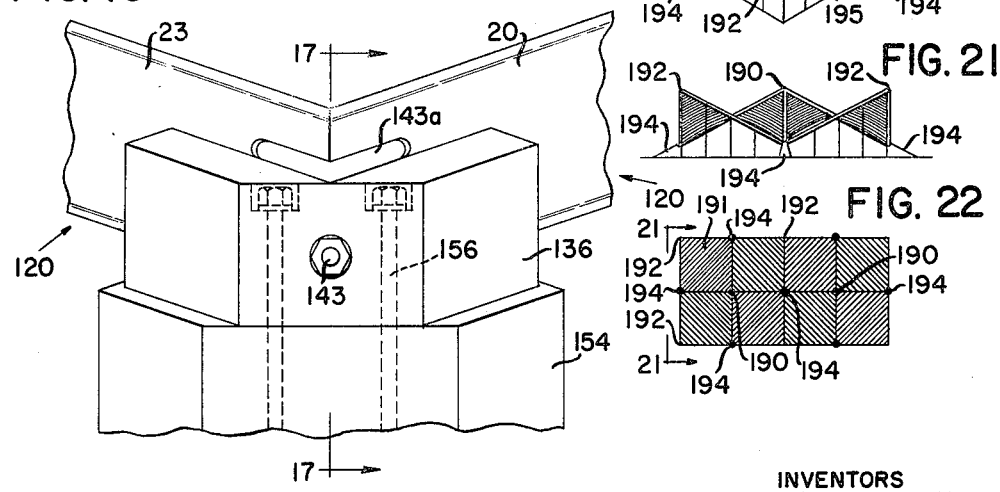
INVENTORS
ERNST J. DeRIDDER
KURT F. GLASER
BY
THEIR ATTORNEYS Sept. 21, 1965    E. J. DE RIDDER ETAL    3,206,895
HYPERBOLIC PARABOLOIDAL ROOF AND METHOD OF MAKING THE SAME
Filed March 27, 1961    6 Sheets-Sheet 6
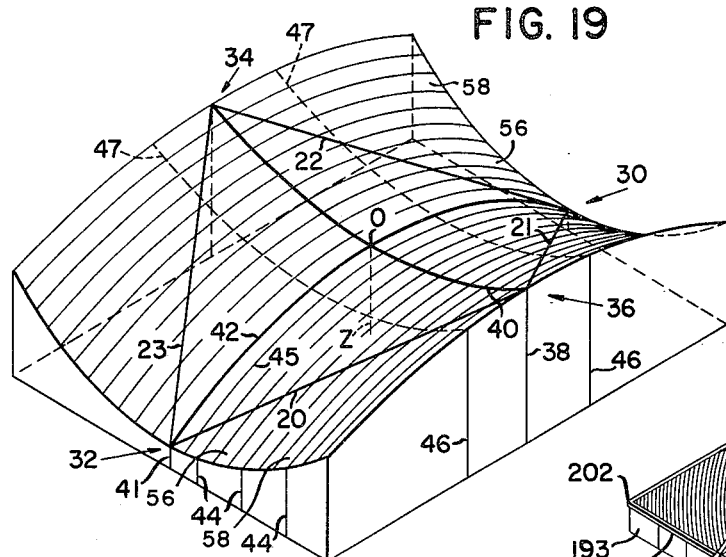
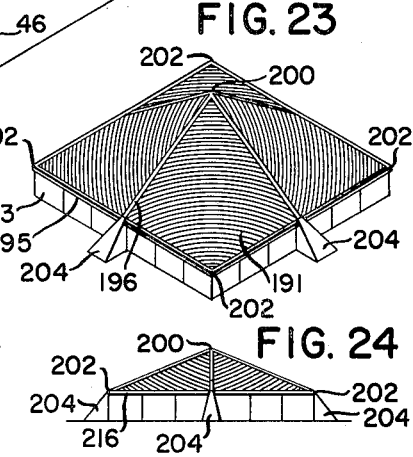
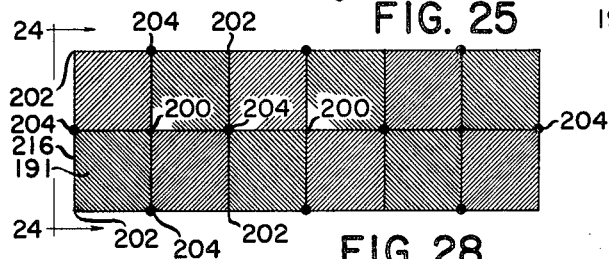
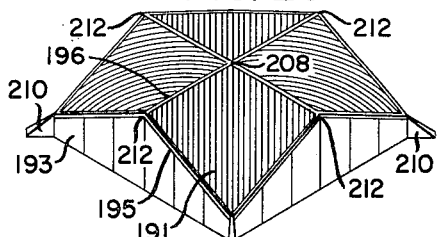
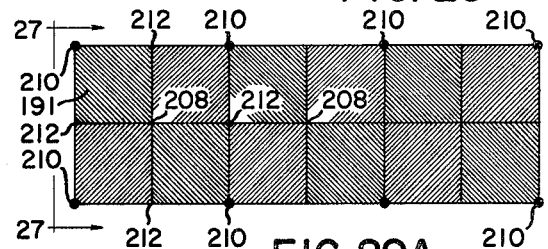
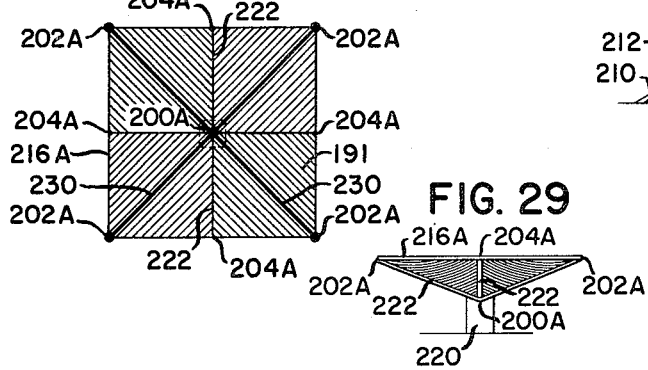
INVENTORS
ERNST J. DeRIDDER
KURT F. GLASER
BY *Glenn, Jackson,*
*Palmer & Matthew*
THEIR ATTORNEYS United States Patent Office 3,206,895
Patented Sept. 21, 1965

3,206,895
HYPERBOLIC PARABOLOIDAL ROOF AND
METHOD OF MAKING THE SAME
Ernst J. De Ridder, Henrico County, and Kurt F. Glaser,
Chesterfield County, Va., assignors to Reynolds Metals
Company, Richmond, Va., a corporation of Delaware
Filed Mar. 27, 1961, Ser. No. 98,501
4 Claims. (Cl. 52—15)

This invention relates to a hyperbolic paraboloidal roof and to the method of making the same.

According to this invention, the hyperbolic paraboloidal roof may be made from longitudinal metal sheet panels which may be extruded, rolled, or otherwise formed from aluminum containing metallic material or similar material.

A large majority of the panels may be made and used without substantial change in the cross-section for substantially the entire roof. The relatively small number of special panels which may be required in the roof may be made from the regular panels in a relatively simple manner.

The roof is of such a character that regular extrusions or similar formations of suitable length may be made, and these formations may be cut to desired length for use on the roof. The special panels may be made from regular formations, for example, by cutting the formations longitudinally to remove a small portion of the formation, and thereafter the cut parts may be re-joined for the production of the special panels. Special panels may also be made by other procedures, such as described elsewhere.

The general surface of a hyperbolic paraboloidal roof is such that, ordinarily, such roof does not lend itself to the use of standard uniform cross-section panels. However, according to this invention, standard formations of uniform cross-section may be cut to the desired length and may be used without material change for the production of the main part of the roof. The small number of special panels may be made from these standard formations in a relatively simple manner.

According to this invention, a method of construction is provided in which a shaping or temporary supporting scaffold is erected over which the roof is made and shaped into a substantially hyperbolic paraboloidal roof.

Other features of the method of making the roof are described elsewhere.

Accordingly, it is an object of this invention to provide a hyperbolic paraboloidal roof embodying one or more of the features herein disclosed.

Another object of this invention is to provide a method of making a hyperbolic paraboloidal roof embodying one or more of the features herein disclosed.

Further objects become apparent from this description and the accompanying drawings, in which:

FIGURE 1 is a plan view of a roof according to this invention.

FIGURE 2 is an end elevation of the roof, taken from he near side of FIGURE 1.

FIGURE 3 is an elevation taken from the left side of FIGURE 1.

FIGURE 4 is a view in perspective showing the side members of the roof, with the straight line generating members placed under the side members, ready to support and shape the panels as they are assembly between the side members.

FIGURE 5 is a plan view of a typical extrusion or panel formation with parts broken away.

FIGURE 6 is an enlarged cross-section of one joint-forming side structure of a panel, of the type which has transverse walls with portions facing or exposed to the outside of the roof.

FIGURE 7 is an enlarged cross-section, somewhat similar to FIGURE 6, but showing the other joint-forming side of the panel structure of the panel of FIGURE 6, with portions facing or exposed to the inside of the roof.

FIGURE 8 is a cross-section of a plurality of assembled centrally located panels taken along the line 8—8 of FIGURE 1, on an enlarged scale.

FIGURE 9 is a plan view, with parts broken away, showing a typical area 9 of FIGURE 1 in enlarged scale.

FIGURE 10 is a substantially vertical cross-section taken along the line 10—10 of FIGURE 9.

FIGURE 11 is a plan view of a typical formation split in a manner to form a special panel, such as shown in FIGURE 12.

FIGURE 12 is a plan view of a special panel formed by uniting the parts of the formation shown in FIGURE 11.

FIGURE 13 is a plan view of another embodiment of a special panel which may be used in lieu of, or in addition to, the panel shown in FIGURES 11 and 12.

FIGURE 14 is a cross-section, on enlarged scale, taken along the line 14—14 of FIGURE 13.

FIGURE 15 is a plan view of a roof, in reduced scale, partially assembled.

FIGURE 16 is an enlarged, diagrammatic view in perspective of the front low corner of FIGURE 1.

FIGURE 17 is a cross-section along line 17—17 of FIGURE 16.

FIGURE 18 is a plan view of FIGURE 16.

FIGURE 19 is a perspective view of a hyperbolic paraboloidal surface generated by the movement of one downward parabola parallel to itself along an upward parabola or vice versa.

FIGURES 20, 21, and 22 are perspective elevational and plan diagrammatic views respectively of one form of assembly of a plurality of hyperbolic paraboloidal roofs according to this invention.

FIGURES 23, 24, and 25 are views similar to FIGURES 21, 22, and 23, respectively, and showing another embodiment.

FIGURES 26, 27, and 28 are views similar to FIGURES 21, 22, and 23, respectively, and showing another embodiment.

FIGURE 29 is a diagrammatic side elevation of another embodiment of a roof suitable to cover a parking space and the like.

FIGURE 29A is a top plan view of FIGURE 29.

FIGURE 30 is a view similar to FIGURE 8 but showing a different embodiment of a central special panel.

FIGURE 31 is a diagrammatic cross-section showing other embodiments of panels.

In FIGURES 1, 2, 3, and 19, the description given with reference thereto is for a hyperbolic paraboloidal roof having a vertical O–Z central axis, FIGURE 19, and vertical director planes on lines OX and OY, FIGURE 1, at right angles to each other. The sides 20, 21, 22 and 23 are substantially equal in length. A first system of straight generator lines, 25a–25f, intersect the sides 20 and 22. A second system of straight generator lines 27a–27f intersect the sides 21 and 23 respectively. The intersections of the lines 25a–25f and 27a–27f establish a hyperbolic paraboloidal general surface for the roof, it being understood that an infinite number of generator lines exist and that the lines 25a–25f and 27a–27f are merely illustrative of a few of such infinite number of lines. It is understood that the invention is also applicable to a roof in which the line O–Z is not vertical, and in which the planes OX and OY are not at right angles to each other, as is well understood in the art to which this invention pertains.

Certain descriptive adjectives and other words, such as "vertical," "horizontal," "upward," "downward," "low," "high," etc., are used herein for brevity, but it is to be understood that such words are applicable to other directions, depending on the actual embodiment used, as is obvious to those skilled in this art.

In this particular illustration, the corners 30 and 32 are the "low" corners, and the corners 34 and 36 are the "high" corners. The main vertical plane 38 intersects the corners 34 and 36 and the axis O–Z intersects the general surface of the hyperbolic paraboloidal roof along a principal upward parabola 40. The central vertical plane 41 intersects the general surface of the hyperbolic paraboloidal roof along a principal downward parabola 42, FIGURE 19, which extends between the low corners 30 and 32 and intersects the vertical axis O–Z.

A plurality (an infinite number) of vertical planes 44, FIGURE 19, intersect the hyperbolic paraboloidal general surface to produce a series of downward parabolas 45 parallel to the principal downward parabola 42. Likewise, a plurality (an infinite number) of vertical planes 46, parallel to the main vertical plane 38, intersect the general surface of the hyperbolic paraboloidal roof in a series of upward parabolas 47 which are parallel to the principal upward parabola 40.

A plurality of united metal sheet panels 50 extend along the general surface of the hyperbolic paraboloidal roof, with their edges 52 lying along certain planes 44 and along certain downward parabolas 45, which planes 44 and parabolas 45 are parallel to the central plane 41 and central parabola 42 which passes through the low corners 30 and 32 and which is substantially perpendicular to a line or plane 38 passing through the high corners 34 and 36. A majority of panels 50 may be of substantially uniform width along their length. The main surfaces of the panels 50 lie along the said hyperbolic paraboloidal general surface, and the ends 53 and 55 of the panels 50 are secured to the side linear members 20, 21, 22, and 23.

The panels 50 thus lie in vertical zones which are parallel to the vertical plane 41. The main surfaces 72, FIGURE 8, of the panels 50, lie in the hyperbolic paraboloidal general surface. These main surfaces 72 of the panels 50 form downward parabolic zones parallel to the principal downward parabola 42.

The hyperbolic paraboloidal surface may also be described as having pairs of diagonally opposed high corners 34 and 36 and low corners 30 and 32, respectively, as having a downward diagonal parabolic central arch, zone, or parabola 42, and as having a plurality of united metal sheet panels 50 lying with their edges 52 substantially along side arches, zones, or parabolas which are parallel to the downward central arch, zone, or parabola 42.

Among the panels used for the construction of the roof, a large majority of panels are regular roof panels 50, which have a continuously equal or uniform width along their main length. They are shown in cross-section in FIGURE 8. In addition, there is a special central panel 54, FIGURE 8, which is placed with its central line 150 in the vertical central plane 41. The panel 54 may be of uniform width along its main length. In addition, there may be one or more special panels 56, FIGURE 12, and/or 58, FIGURE 13. The panels 56 and/or 58 are used to compensate for a slight over-width of the regular panels 50 in the zone adjacent the central plane 38, or in the zone adjacent to the principal upward parabola 40, as compared to the width of the panels near the sides 20, 21, 22, and 23. This slight overwidth of the regular panels 50 is cumulative as the roof is being laid from the central panel 54 outward in both directions, as shown in FIGURE 15. Therefore, an accumulated error may be built up during the building of the roof. To overcome such accumulated error, one or more special panels 56 and/or 58 may be placed in the roof at any desired stage of completion of the roof in order to compensate for the accumulated error produced during the building of the roof. Generally, the remainder of the side of the roof in which such special panel 56 or 58 is introduced may be completed with regular panels 50.

The regular panels 50, as well as the special panels 56 and/or 58, are provided at their edges with joint-forming side structures, including transverse walls 60–62, FIGURE 6, and other transverse walls 64–66, FIGURE 7. When the roof is assembled, the part 60, FIGURE 6, of the wall 60–62 faces or is exposed to the outside of the roof, while the part 66 of the other transverse wall 64–66, FIGURE 7, faces or is exposed to the inside of the roof. The part 64 is considered to be covered by the curled lip 68 of the part 60 of the adjacent panel, so that the part 64 is not described as facing outside of the roof. Likewise, the part 62 is covered by the lip of flange 70 of the part 66 of the adjacent panel, so that the part 62 is not described as facing on the inside of the roof. These transverse walls, 60–62 and 64–66, are attached to the edges of the main bodies 72 of panels 50.

The transverse walls 60–62 are also attached to the main bodies 74–76 of the special panel 54. The special panels 56 and 58 have transverse walls 60–62 and 64–66 attached to their main bodies 78 and 80 of panel 56 and to the main body 82 of panel 58.

These transverse walls 60–62 and 64–66 are also provided with interlocking means 84, so that the panels do not tend to pull apart and open at the seams by sidewise tension, parallel to parabola 40, when the panels have been assembled. To this end, a hook 86, FIGURE 7, is provided for the transverse wall 64–66, and a hook 88, FIGURE 6, is provided for the transverse wall 60–62. The hooks 86–88 engage each other, as shown in FIGURE 8, so that the panels are prevented from pulling away from each other sidewise along the seams. During assembly, a hook 88, for example, is inserted in the opening or cavity 90 of an adjacent panel and a hook 86 is inserted into the opening or cavity 92 of an adjacent panel to produce this interlocking feature.

The panels and their edges at 62 and 66 may be secured together by bolts, rivets, or welds 63, FIGURE 8, at desired intervals along the length of the panels. This holds the hooks 86 and 88 in locked position and prevents spreading apart of the panels.

A suitable mastic or other sealing or adhesive compound may be placed at the interlocking joint produced by the hooks 86 and 88 and by the cavities 90 and 92, also to secure the panels together and/or to seal the joint against leakage. The joints may be welded, brazed, or soldered instead, as elsewhere described.

The curl 68, FIGURES 6 and 7, curls around a bead 94 of an adjacent panel. A hook 96 on the lip 70 engages an adjacent bead 98 in the lip 100 of the wall 60–62. This also is an aid in locking the panels together and in preventing leakage at the joints.

If desired, a downward reinforcing lip 102, FIGURE 8, may be placed on the undersurface of the main bodies 72 of the regular panels 50. This downward lip or flange 102 may be eliminated during the production of special panels 54 and 56, but may remain in the production of regular panels 58.

The special panel 56 of FIGURES 11 and 12 may be made from stock extrusion or other formation 180, FIGURE 5, which is also used to make the regular panels 50. For example, regular panel stock 180 may be split in two halves, as shown in full lines at 50A and 50B in FIGURE 11. This may be done by cutting the panel stock 180 in two halves, with straight inner sides 104 and 106. These straight sides may be then cut or ground into slightly circular or curved sides 108, which are shown in dotted lines in FIGURE 11. The previously curved sides 108 may be secured together to form the straight seam 110 by welding, brazing, or soldering, with proper heat treatment for strength. This forms the special panel 56 with inwardly curved sides 112 and 114. These curved sides may have the transverse members 60, 62, and 64, 66 to cooperate with the sides of regular panels 50. Two of these panels 56 may be placed on either side of the central plane 41, each about halfway between the central plane 41 and each of the high corners 34 and 36. Such panels will compensate for the accumulated overwidth of the regular panels 50 along the plane 38 and the adjacent area or zone and also to compensate for the accumulated error that will be produced between the special panel 56 and the respective high points 34 and 36.

The special panel 58, FIGURES 13 and 14, may be used in lieu of, or in addition to, the special panel 56. The panel 58 may be made from a regular panel stock 180, FIGURE 5, by producing gradually increasing excessive curvature in the main body 72A in the zone adjacent to the central plane 38. This excessive curvature, which is shown in FIGURE 14, causes the sides 116 and 118 to curve closer together near the center plane 38 in a manner similar to that of the special panels 56. Alternatively, the central body 72A of the panel 58 may be rolled out thinner near the ends of the panel 58, thus widening the distance between the sides 116 and 118 near the ends of the panel, without the necessity of excessively curving the body 72A. Alternatively, the body may be curved downwardly, as shown at 72B, in dotted lines in FIGURE 14, to produce the convergence of the sides 116 and 118. The convergence of sides 116 and 118 in FIGURES 13 and 14, as well as sides 112 and 114 in FIGURES 11 and 12, is shown in relatively exaggerated form which may be almost imperceptible in actual practice.

The sides 20, 21, 22, and 23 of the roof may be made of aluminum containing metallic material which has been extruded or otherwise formed with a cross-section substantially as shown in FIGURE 10 and 17. Such extrusion or formation 120 may be somewhat channel-like in construction and provided with a main web 122 and edge flanges 124. The web 122 may also be provided with two intermediate flanges 126 and 128, which receive the ends 53 and/or 55, FIGURE 1, of the panels 50, 54, 56, and/or 58. The panels 50 may have their side members 60 and 64 cut or ground off, as indicated at 130 in FIGURE 10, so that the main body 72 may fit under the flange 126, while the member 70 rests on the flange 128. The main body 72 and the under-members 70 and 100, FIGURES 6 and 7, are secured to the flanges 126 and 128 respectively by any type of fastening devices 132, which may be in the form of rivets, bolts, or similar fastening devices. Similar attaching constructions may be made at each of the sides 20, 21, 22, and 23, as is obvious. Welding, brazing, or adhesive action may be used alternatively or additionally.

The channel-like members 120, which form the sides 20, 21, 22, and 23, may be secured together at the abutting ends by any suitable fastening means, such as plates 134, FIGURES 1 and 4, which may be attached by welding or bolting to the upper flanges 124. Similar plates 134 may be provided for the under flanges, if desired, for the high corners 34 and 36, as shown in FIGURE 2.

If desired, the low corners 30 and 32 may be provided with special attaching and reinforcing blocks 136, FIGURES 2 and 16–18, which may be attached by welding or the like to the lower flange 124. As shown in FIGURES 16, 17, and 18, the blocks 136 have not been shown to extend up over the upper flanges 124, but, if desired, such blocks may be made so to extend, as indicated by the dotted line 138 in FIGURE 17. Such extension would have an opening indicated by the dotted line 140 to align with the drain openings 143a made at the ends of the channel-like members 120, which form the sides of the roof and which converge and are attached at the low corners 30 and 32 by such reinforcing blocks 138. The flanges 126 of the channel-like members 120 may be cut away, as shown in FIGURE 17, to provide a smooth drainage surface along the surface 76 of the central panel 54. These reinforcing blocks may be pulled together by a tension bar 143, made of strong steel, which passes through the blocks 32, the converging main bodies 122 of the sides 20–23. The bar 143 may be provided with a turn buckle 144, FIGURE 3, which, with the nut construction 146 may be used to pull the low corners 30 and 32 of the roof toward each other the desired amount. The bar 143 may be made in two parts which are held together by the turn buckle 144.

The special panel 54, shown in FIGURE 8, may be made by cutting the stock 180, FIGURE 5, either on each side of the reinforcing flange 102 or exactly at the middle, after the flange 102 has been ground off. Two identical halves of the cut stock 180, which are indicated by the numerals 74 and 76 in FIGURE 8, may be made to match against each other by turning the side 76 end to end after the cutting operation, so that they abut against each other at 150, FIGURE 8, where they may be joined together by a plate 152 which runs the length of the special panel 54 and which may be welded, brazed, adhered, or otherwise secured to the sides 74 and 76, to make a firm central panel 54.

FIGURE 8 shows the panels 50 and 54 substantially in a straight plane. However, there is an infinitesimal upward curling of the central panel 54 and the two panels 50, due to the parabolic curvature 40, which is very negligible at the place where the special panel 54 is located, and so has not been illustrated in FIGURE 8.

The low corners 30 and 32 may be properly spaced with respect to each other by means other than the tension bar 142, if desired. For example, a buttress 154 at each low corner 30 and 32 may be firmly anchored on the foundation under the roof, and the blocks 136 may be bolted thereto by bolts 156 in such a manner that the blocks 136 hold the corners 30 and 32 properly spaced from each other with or without the use of the tension bar 142. The drain opening 143a is for the purpose of permitting drainage of rain water or melted snow to pass out at the low corners 30 and 32.

FIGURE 19 may be described as an imaginary block of rectangular shape in horizontal directions. That is, it has vertical side walls perpendicular to each other, a flat horizontal base, and a hyperbolic paraboloidal upper surface, as illustrated. The roof illustrated in the other figures may be mentally cut out along lines 20, 21, 22, and 23 of FIGURE 19. The purpose of FIGURE 19 is to show how the hyperbolic paraboloidal surface may be generated by moving the parabola 42 parallel to itself along the parabola 40, or vice versa. The surface between the sides 20, 21, 22, and 23 of the actual roof may also be generated by the intersection of straight generator lines 25a to 25f and 27a to 27f, FIGURE 1, and the intersections of the infinite number of other such lines that may be placed along and at right angles to the sides 20, 21, 22, and 23. The result is the same.

The ability to generate the hyperbolic paraboloidal surface by the straight generator lines 25a to 25f and 27a to 27f may be used to produce a temporary scaffold or template having the function of generator lines 25a to 25f and/or 27a to 27f upon which the roof may be assembled. For this purpose, FIGURES 1 and 4 may be compared, in which FIGURE 4 shows the channel members which form the sides 20, 21, 22, and 23 partly joined together by the plates 134, with the sides 20 and 22 resting on straight bars 175a to 175f, which are placed in positions corresponding to the lines 25a to 25f of FIGURE 1. The top straight line surfaces 178 of the members 175a to 175f and between the members 20 and 22 may be placed at a level slightly higher than the bottoms of the sides 20 and 22, so that the line surfaces 178 correctly receive the flanges 70 of the panels 50, etc., of FIGURE 7 at the right height to place the main bodies 72 of the panels 50, etc., at the general surface of the hyperbolic paraboloid desired to be established by the roof. That is, the line surfaces 178 are generator surfaces which establish or "generate" a hyperbolic paraboloidal surface which is below and "parallel" to the desired general surface of the roof. The members 175a to 175f may be supported by a plurality of bars or members 177a to 177f, shown in dotted lines, which correspond to lines 27a to 27f of FIGURE 1, and which may be placed underneath the bars 175a to 175f, and which may comprise scaffolding or the like which is supported by upright members, not shown, extending up from the foundation or floor underneath the roof. The bars 177a to 177f may be underneath the bars 175a to 175f and need not be used as generator lines. However, if desired, the bars 175a to 175f and 177a to 177f may be formed as a net or crate, with their surfaces all acting as generator lines for the hyperbolic paraboloidal roof. As previously indicated, the surfaces 178 of FIGURE 4 (and similar surfaces of bars 177a–177f, if desired) lie at the proper level to establish a hyperbolic paraboloidal construction on which the panels 50 and the special panels 54, 56, and 58 are laid along planes 42 and 45 of FIGURE 19. For example, the first panel to be laid on the bars 175a to 175f is the special panel 54 of FIGURE 8. This special panel 54 is laid with its center line 150 along the central plane 41, FIGURES 1, 8, and 15, and the special panel 54 is pushed down firmly against the supporting surfaces 178, wherever the panel 54 crosses the members or surfaces 178. The ends of panel 54 are then attached to sides 20 and 23 and 21 and 22 respectively at the low corners 32 and 30. Thereafter, the panels 50 are laid serially outward from the central panel 54. Such panels 50 (and 56 or 58) are laid serially in a manner which is an extension of the construction shown in FIGURE 8. A later stage of panel laying is illustrated in FIGURE 15, where eleven regular panels 50 have been shown to have been laid on the sides of the special panel 54. This laying operation continues outwardly toward the high corners 34 and 36 until the high corners 34 and 36 are reached, to produce a complete roof, as shown in plan view in FIGURE 1.

The regular panels 50 for the roof may be cut from regular stock in the form of long extrusions 180, FIGURE 5, which have a cross-section similar to that of the regular panels 50. The special panels may be also made from the stock 180, since cutting such stock 180 to the desired length produces a regular panel 50. The stock 180 may be modified to produce any of the special panels 54, 56 and/or 58 heretofore described.

FIGURE 20 is an isometric perspective view of one-half of the plan view 22. FIGURE 20 shows an assembly of four roofs of the character shown in FIGURES 1, 2, and 3. Four of the high corners, such as high corners 34 and/or 36 of FIGURES 1, 2, and 3, converge at the central point 190, while the other high corners 34 and/or 36 of FIGURES 1, 2 and 3 extend outwardly, or overhang, at the corners 192. Two of the low corners, such as 32 and/or 30 of FIGURES 1, 2, and 3, converge at one of the buttresses or pillars 194, while another pair of low corners 32 and/or 30 converge at another buttress. The other low corners of the four roofs cannot be seen in FIGURE 20, since they are behind the figure. The strips 50 are illustrated by lines 191, as will be evident.

Some of the sides 20, 21, 22, and 23 of FIGURES 1, 2, and 3 may rest on the building walls, 193 at 195. Other sides 20, 21, 22, and 23 may be attached together along the lines 196.

FIGURE 21, which is an end view, is taken from the line 21—21 of FIGURE 22. Its construction will be apparent from the previous description of FIGURE 20, since the same reference numerals are applied to FIGURE 21, so that the same may be understood. FIGURE 22 shows two assemblies of the character shown in FIGURES 20 and 21 placed together and so aligned that the second assembly is not evident in FIGURE 21 and has been omitted in FIGURE 20. However, the construction of FIGURE 22 is self-evident from the applied reference numerals and the previous description of FIGURES 20 and 21.

FIGURE 23 shows four roofs of FIGURES 1, 2, and 3, etc., assembled together with four of the high corners 34 and/or 36 converging at the high point 200 and with the other "high" corners 34 and 36 respectively at the corners 202 of the building. Pairs of "low" corners, either 30 or 32, converge and are supported by buttresses 204, two of which can be seen and two of which cannot be seen. FIGURE 24 shows an end view from the line 24—24 of FIGURE 25, which is not further described, since its construction is evident from previous description of FIGURE 23 in connection with the reference numbers applied to FIGURE 24. FIGURE 25 shows three of the edifices of the character shown in FIGURES 23 and 24 placed side by side. The construction of FIGURE 25 is evident from the previous description and the applied reference numerals.

The parabolas of FIGURES 23–25 are not exactly vertical but are in a position such as if one high corner 34 were placed high at 200 and the other high corner 36 were placed at a lower level, such as 202. This will now be evident to those skilled in the art.

FIGURE 26 shows an assembly of four roofs of the character shown in FIGURES 1, 2, and 3, with four of the "low" corners 30 and/or 32 converging at the high point 208. The four other "low" corners 30 and/or 32 are supported by the buttresses 210. Pairs of "high corners 34 or 36 converge at the peaks 212. FIGURE 27 is an end view taken along the line 27—27 of FIGURE 28. The construction will be apparent from the reference numerals which have been applied to correspond with those of FIGURE 26 and to which the same description applies.

FIGURE 28 is a plan view of three of the edifices shown in either FIGURE 26 or 27, assembled side by side in a manner similar to that shown in FIGURES 22 and 25. The reference numerals on FIGURE 28 make the same self-evident.

FIGURE 29 is a construction suitable for providing parking space for cars and the like and is held up by the rigid central pillar 220. The drainage is toward and down a drain in the center of a pillar 220, which supports the entire structure and has a downward central axial drain opening, to which the roof is rigidly attached. In this type of construction, the perimeter 216A of FIGURE 29 is produced by continuous heavy bars also marked 216A completely across the entire upper side edges of the roof. Rigid bars 222 extend radially outward intermediate the corners 202A. Bars 222 are tied to the centers of bars 216A at 204A and to the pillar 220 at 200A. These members 222 and 216A produce the same type of reaction which prevails in all of the side members of other embodiments of this invention.

In FIGURE 29, the corner points 202A and the central point 200A may be the "low" corners 30, 32. Likewise, the central points 204A may be the "high" corners 34 and 36. The rods 230 extend diagonally across the top of the roof between the diagonally opposite corners 202A.

If desired, the roof FIGURES 29 and 29A may be supported at 216A by side walls similar to those shown in FIGURES 20–28. Central pillars 220 are retained. Several roof units of FIGURES 29 and 29A may be united side by side as shown in FIGURES 20–28.

The side walls 193 of the buildings of FIGURES 20 to 28 reinforce the sides 20, 21, 22, and 23 of FIGURES 1, 2, and 3. Likewise, the uniting of such sides 20, 21, and 23 along 196 also produces a desirable reinforcement against wind action, deflections of high corners, lateral deformation, stiffening of the free corners, vertical deformation, and the like.

FIGURE 30 shows another embodiment 54A of a central panel. The central panel 54A may be made from a regular stock 180, but differs from the central panel 54 in that the side members 64, 66, FIGURE 7, of the regular panel blank or extrusion are used for the outer sides of the panel 54A. Suitable lengths of identical half portions 74A and 76A of the extrusion 180 of FIGURE 5 may be cut so that they each have the side portions 64 and 66. These half portions 74A and 76A may be brought into abutting relationship at the point 150A and may be secured together by welding with the plate 152A. The panels 50, on either side of the special panel 54A then have their portions 60 and 62 slanting downwardly along the upward parabolas which are parallel to the upward parabola 40, and thus provide a better drainage.

Under certain circumstances, the panels of the roof may be made substantially without any side flanges 60, 62, 64, 66, etc., as shown in FIGURE 31. A special central panel 54B may be a panel of flat sheet material 74B, extruded or rolled, which may be slightly prearched, if desired, as shown in FIGURE 31. This panel 54B may be placed at the same position as the panel 54 in FIGURE 1, and it will be properly bent at the downward parabola 42 by the action of the scaffold surfaces 178 of FIGURE 4 when the panel 54B is laid over such surfaces 178 at the start of the roof laying operation. Thereafter, regular panels 50B may be overlapped over the edges of the special panel 54B and may be secured thereto by any suitable means, such as by riveting, welding, brazing, soldering, adhering, or any other desired method of attachment. The welding or brazing material may be a relatively low melting temperature metal. The adhesive may be a strong, settable adhesive which sets by lapse of time or by relatively low heating temperature, etc. Thereafter, additional panels 50B may be laid on either side of the first pair of panels 50B, etc., as previously described, to complete the roof in the manner indicated in FIGURES 15 and 1. The overlapping joints 51B may be substantially uniform in width, as are also the panels 54B for the roof. However, a slight variation in the width of the overlap at the joints 51B may be tolerated or provided, in order to compensate for any variation in width that may be necessary because of the slight overwidth previously described as the production of the roof proceeds. Also if desired, a combination of riveting and welding may be used, together with any desired sealing, adhesive, welding, or brazing compound at the overlap, as desired. The use of the straight line generator members 175a to 175f of FIGURE 4 enables the production of the hyperbolic paraboloidal roof with substantially flat panels 50B, 54B, etc.

The panels 50B, 54B, etc., may be of uniform width and/or thickness throughout their main lengths. However, if desired, longitudinal reinforcing lips or flanges 102B, downward or upward, may be formed or extruded intermediate the edges and on the faces of these panels, similar to lips or flanges 102 of panels 50. Also, interlocking indentations, etc., similar to 86, 88–91 of FIGURES 6 and 7 may be provided at the joints 51B.

The panels 50B and 54B, etc., are made of sufficient thickness and strength to withstand the tension and compression stresses.

The joints 51B, FIGURE 31, are shown as flat lapping joints. However, this showing is intended to be emblematic of any suitable joint construction which is sufficiently strong and leak-proof for the particular use to be made of the roof.

The joints 51B actually may be of any desired construction. For example, they may have the hook and cavity construction shown at 86 and 88–91 in FIGURES 6 and 7 without the flange constructions 60, 62, 64, 66, etc. The joints 51B may be single strap butt construction as shown at 150, 152 in FIGURE 8. They may be of flat lock seam construction or flush lap construction or double lap construction, if desired.

The joints may be riveted, welded, brazed, soldered, adhesively secured together, etc., in any manner to provide the strength necessary for the particular roof being used.

The scaffold support of the roof permits a relatively large latitude in the formation of the joints.

For example, the joints 51B may be brazed together. The panels 50B, 54B, etc., for example may be of aluminum containing metallic material, such as of any desired and suitable aluminum alloy. For example, the panels 50B, 54B, etc., may be chosen from aluminum alloys Nos. 1100, 3003, 6053, 6061, 6062, 6063, 6951, etc. The joints 51B may be brazed with aluminum brazing filler metals BAlSi–1; BAlSi–2; BAlSi–3; BAlSi–4; etc., so that the filler metal melts below the melting point of the panel metal.

The panel areas may be cleaned according to established aluminum brazing practice and a suitable well known flux may be placed at or in the joint along with the brazing filler metal. The filler metal and/or the flux may be placed in or adjacent to the joint in any form, such as strip form, granulated form, etc. The joint may then be brazed by any suitable heating means, such as by torch heating, or electric heating.

If desired, the joints are heat treated as they are formed to impart strength to the panel edges and joints. Any method of providing a suitable quenching action followed by a suitable aging action may be used.

For example, the joints may be brazed from the center panel 54B outward. The joint may be air or water quenched as quickly as practical as and after the joint is brazed and may be aged in any suitable manner, including natural aging or artificial aging.

Welding may be similarly used.

Strong adhesives may be used under certain conditions. They may be settable by lapse of time or by heating to a temperature preferably below the recrystallization temperature of the panel metal at the joint.

The panels 50B, 54B, etc., may be made of clad brazing sheet material in which the aluminum alloy core material of the sheet is clad at least at the joint with a lower melting point cladding composition. For example, the core may be made of aluminum alloys 3003 or 5961 and the cladding composition may be aluminum alloys 4043(1) or 4043(2). When these brazing sheets are used, the brazing compound is automatically supplied at the joint. Only cleaning and flux need be added according to standard brazing practice.

The roof, the side members 20, 21, 22, and 23, and the panels 50, 54, 56, 58, 50B, 54B, etc., may be of any suitable size, as required by the calculated forces, weights, etc., that are to be expected on the roof. Merely by way of example, the sides 20, 21, 22, and 23 of the roof may be 25 feet long. The panels 50 may be substantially 6 inches between the surfaces 89 and 91 of the hooks 86 and 88 in FIGURES 6 and 7. The panels 50 may be aluminum alloy 6061-T6 in extruded form and may have a weight of 1.842 pounds per running foot. The side channel-like members, which form the sides 20, 21, 22, and 23 may be from 6 inches up to 12 inches in height (width) and of any desired thickness, so their weight is 2.32 pounds or more per running foot. The general thickness of the panels 50 may be in the order of .062 inch in thickness. The distance from the upper surface of the body 72 to the under surface of the flange 70 may be in the order of one inch. The distance from the upper surface of the main part of panel 72 to the center of the bead 94 may be of the order of .298 inch, and other parts may be of corresponding relationship, as shown in FIGURES 6 and 7. In general, all of the parts may be made of aluminum containing metallic material, such as aluminum alloy 6061-T6. The "vertical" distance between the low corners 30 and 32 and the high corners 34 and 36 may be in the order of 6 feet, when the sides are 25 feet long. The panels, side rails, and the other components of the roof may be used for making larger or smaller roofs, such as up to 50 feet on each side 20, 21, 22, and 23, when the expected load is not unusual.

Thus is is to be seen that an improved hyperbolic paraboloidal roof structure and method of making the same have been provided by this invention.

While the form of the invention now preferred has been disclosed in accordance with the requirements of the statutes, other forms may be used, all coming within the scope of the claims which follow:

What is claimed is:

1. A roof supported on two pairs of intersecting side-linear members at pairs of diagonally opposed high corners and low corners respectively, said roof having a substantially hyperbolic paraboloidal general surface containing two systems of straight lines, each system being parallel to a different director plane of two director planes which form an angle with each other and in which the intersections of the lines of one of said systems with the lines of the other of said systems establish said general surface of said roof, said roof having a plurality of integral continuous united metal sheet panels with their edges lying in planes which are substantially parallel to a central plane which passes through said low corners and is substantially perpendicular to a line passing through said high corners, the main surfaces of said panels being of continuous length and lying substantially along said hyperbolic paraboloidal general surface, and the ends of said panels being secured to said linear members said panels having joint forming side structures including integral transverse walls facing the outside of said roof with water sealing means at the edges of said transverse walls and terminating a short distance from said linear members to provide drain channels along said side linear members from said high corners to said low corners.

2. A roof according to claim 1 in which said panels and joint-forming side structures are integral extrusions and said side linear members having drain outlets at said low corners.

3. A roof having a substantially hyperbolic paraboloid general surface established by the intersections of two systems of straight line generators, said general surface having a principal parabolic central arch in a planar zone diagonal to said straight line generators and a plurality of diagonal parabolic side arches on both sides of said central arch in planar zones parallel to the planar zone of said central arch, said roof having a plurality of integral united metal sheet panels lying substantially along said arches and extending integrally the full length of said arches, the main surfaces of said panels lying substantially along said hyperbolic paraboloidal general surface and interlocking joint forming side structure along both edges of said panels in which said joint-forming side structures include transverse walls with some of said walls facing the outside of said roof and other transverse walls facing the inside of said roof, and in which some of said transvere walls which face the outside of the roof have a hook and in which other transverse walls have a bead mating with said hook, and in which some of said joint forming side structures have a hook and cavity and in which other joint forming side structures have a cavity and hook to receive a respective said hook and cavity.

4. A roof having a substantially hyperbolic paraboloid general surface established by the intersections of two systems of straight line generators, said general surface having a principal parabolic central arch in a planar zone diagonal to said straight line generators and a plurality of diagonal parabolic side arches on both sides of said central arch in planar zones parallel to the planar zone of said central arch, said roof having a plurality of integral united metal sheet panels lying substantially along said arches and extending integrally the full length of said arches, the main surfaces of said panels lying substantially along said hyperbolic paraboloidal general surface and interlocking joint forming side structures along both edges of said panels and in which said joint-forming side structures include transverse walls with some of said walls facing the outside of said roof and other transverse walls facing the inside of said roof in which some of said panels are extruded and in which some of said transverse walls which face the outside of the roof have a hook and in which other transverse walls have a bead mating with said hook, and in which some of said joint forming side structures have a hook and cavity and in which other joint forming side structures have a cavity and hook to receive a respective said hook and cavity.

References Cited by the Examiner

UNITED STATES PATENTS

| 269,297 | 12/82 | Kozer | 50—8 |
| 2,582,723 | 1/52 | Stemmons | 50—52 |
| 2,891,491 | 6/59 | Richter | 50—52 |
| 2,918,151 | 12/59 | Kennedy | 50—52 |
| 3,055,461 | 9/62 | De Ridder | 189—34 |
| 3,085,367 | 4/63 | De Ridder et al. | 50—235 |

FOREIGN PATENTS 465,876  5/37  Great Britain.

OTHER REFERENCES

"Architectural Record," July 1958, page 195.
"Construction Methods," December 1958, pp. 60 and 61.
"Engineering News Record," January 1, 1953, page 25.
"Engineering News Record," October 25, 1956, page 33.
"House and Home," August 1955, pp. 94–97.
"Progressive Architecture," July 1955, page 112.

HENRY C. SUTHERLAND, *Primary Examiner.*

WILLIAM I. MUSHAKE, JACOB L. NACKENOFF,
*Examiners.*